2,818,344

Patented Dec. 31, 1957

2,818,344

PAINT COMPOSITIONS

Stanley J. Buckman, Raleigh, Tenn., assignor to Buckman Laboratories, Inc., Memphis, Tenn., a corporation of Tennessee No Drawing. Application March 4, 1957
Serial No. 643,517

15 Claims. (Cl. 106—15)

The present invention relates to improved paint compositions and to films deposited from such compositions which contain ingredients that contribute substantially to the production and maintenance of cleaner, longer-lasting films.

Paint is defined as a pigmented liquid composition which is converted to an opaque solid film after application as a thin layer (ASTM Standard D 16–52, American Society for Testing Materials, Philadelphia, Pa.). However, the term as used herein is restricted to paints which contain drying oils or oil varnishes as the basic vehicle ingredient, conforming more specifically to the definition of "oil paint" but including within its purview those "emulsion paints" and "latex paints" as defined by the American Society for Testing Materials, in which oil or oil varnishes are included in the vehicle. Consequently, the term "paint" as used herein and in the claims should not be subjected to any further restriction than is evident from and required by the nature of the invention herein disclosed.

Films deposited from paints which contain drying oils or oil varnishes are subject to disfiguration, much of which has been proved to be the result of the growth of molds on the films and the accumulation of dirt which is partially or completely entrained and held on the surface of the films by the growth structures of the molds, and which is referred to herein as associated dirt. A number of different types of organomercurials, such as those disclosed in U. S. Patent No. 2,097,339, and chlorinated phenols, as well as many other mold-inhibiting agents or preservatives, have been suggested and tried in paints. Many of these compounds are exceedingly toxic to molds in conventional laboratory test media and some have demonstrated effectiveness in other applications, such as in agricultural sprays, but they have proved to be surprisingly ineffective when they are incorporated in films of drying oils, oil varnishes, and paints containing these vehicles. Fundamental studies by J. M. Leonard and his associates (U. S. Naval Research Laboratory Reports 4228, 1953 [OTS PB 111250] and 4674, 1955 [OTS PB 111868]) have suggested possible causes of the pronounced reductions in effectiveness which have been observed. W. G. Vannoy (American Paint Jour., vol. 40, No. 30, page 93, April 9, 1956) has summarized the inadequacies of the currently available paint preservatives with the following conclusion: ". . . there is a definite need in white house paints for improved mildew [mold] inhibitors."

It is known that paints containing large proportions of zinc oxide are much more resistant to mold growth and associated dirt collection than those lacking substantial amounts of zinc oxide. However, such films fail prematurely by cracking, checking, flaking, and blistering. In addition, the adverse effect of zinc oxide on adhesion results in poor repaint characteristics for a surface previously finished with a paint containing this material and, particularly so, when the surface is refinished with a paint having an alkyd-resin vehicle. Films containing zinc oxide also are especially susceptible to staining by corroding iron (H. T. Morgan and J. H. Calbeck, Cause and Prevention of Staining on White Paints, Indus. and Engin. Chem., vol. 18, No. 12, pages 1227–1228, 1926).

As the result of the adverse effect of zinc oxide on the general durability of paint films and the high susceptibility of paint films containing this material to staining by iron, the paint industry has moved toward the elimination of zinc oxide and resorted to chalking as a means of partially removing disfiguring mold growth and associated dirt from the surface of the films. Chalking is defined as that phenomenon manifested in paint films by the presence of loose removable powder, evolved from the film itself, at or just beneath the surface (ASTM Standard D 659–44). The time necessary for calking to begin and the amount of chalking after the process has started are the result of the complex interaction of a number of factors including composition of the pigment system, both hiding and extender pigments, as well as the composition of the nonvolatile portion of the vehicle system which forms the binder of the paint film. Selection of the type of titanium dioxide pigment employed has been the approach most generally used to produce desired differences in the chalking characteristics of paint films. All paint pigments, including the most chalk-resistant rutile titanium dioxide, chalk to some extent during the life of exterior paints and usually start chalking sometime during the first year of exterior exposure. Inherently, rutile titanium dioxide has greater chalk resistance, type for type, than anatase titanium dioxide.

The chalking characteristics of the titanium dioxide pigments, particularly anatase, have been extensively utilized as a method of controlling the amount of disfigurement of paint films by mold growth and associated dirt collection. However, life of the paint film is sacrificed when it is necessary to have the film chalk excessively to maintain a satisfactory appearance. In addition, the accumulation of "chalk wash" on the lower portions of houses, particularly brick and stone surfaces, discolors these surfaces and renders them unsightly. In view of these problems, there has recently been a trend in the paint industry toward the use of the more chalk-resistant rutile titanium dioxide pigments in white paints for exterior use. In colored exterior paints and automotive enamels and lacquers, the more chalk-resistant rutile titanium dioxide pigments also have been products of choice because of their resistance to fading of the tints caused by chalking of the white titanium dioxide pigment.

Heretofore, it has not been possible to take advantage of the superior whiteness and lower cost of the anatase titanium dioxide pigments compared with the rutile types when a high chalk resistance was desired. In order to achieve maximum chalk resistance with the rutile titanium dioxide pigments, it has been necessary to incorporate in them small amounts of other materials, such as zinc oxide, and sacrifice whiteness as well as ease of dispersion. To recover these desirable properties, the industry has turned toward rutile titanium dioxide pigments which do not contain zinc oxide or reaction products of this material with titanium dioxide and have a somewhat lower chalk resistance. If the maximum chalk resistance could be achieved in other ways without sacrificing other desirable properties, it is apparent that benefits would be realized.

The principal objects of the present invention are to provide paint compositions which deposit films that are substantially improved with respect to mold resistance and associated dirt collection, combined with a reduction in chalking, as well as increased whiteness, without increasing susceptibility to iron staining, and without adversely affecting drying time and subsequent adhesion of the paint film to the surface to which it is applied to an undesirable degree. It is a further object to provide preservatives for paints which permit the achievement of these objectives without affecting other important paint properties to the degree that they cannot be readily compensated for with conventional adjustments of the paint formulations.

Other objects and advantages of my invention, some of which are referred to hereinafter, will be apparent to those skilled in the art to which it pertains.

In the course of investigations of a large number of substances which might be useful in inhibiting mold growth on films deposited from paint compositions, I discovered that certain of the barium borates, when dispersed in paint compositions, accomplished the foregoing objectives. The paint compositions of the present invention and methods by which they may be prepared, which are described hereinafter, are based on this discovery.

By the term "barium borates," as used broadly herein, I refer to compounds such as those in the following list, which include both the effective ingredients or preservatives in the paint compositions of the present invention, as well as others that are referred to and compared, but which are excluded from the general scope of the invention. Some of these barium borates are known and have already been described. Since there is some confusion in nomenclature and designation of the different barium borates, the following compounds represented by Berzelian formulae are specifically set forth, each with that single preferred name by which it will be exclusively referred to subsequently herein, and its melting point, as reported by Ernest M. Levin and Howard F. McMurdie, Jour. of the Amer. Ceramic Soc., vol. 32, No. 3, pages 99–105, 1949:

|  | Melting point, ° C. |
|---|---|
| $3BaO \cdot B_2O_3$, barium orthoborate | 1383 |
| $BaO \cdot B_2O_3$, barium metaborate | 1095 |
| $BaO \cdot 2B_2O_3$, barium tetraborate | 900 |
| $BaO \cdot 4B_2O_3$, barium octaborate | 879 |

Reference should also be made to those barium borates which include silica, such as barium borosilicate, $3BaO \cdot 3B_2O_3 \cdot 2SiO_2$, which is reported to melt congruently at 1009° C. and is referred to in Example 3 hereinafter.

These borates of barium have been and can be prepared by fusion of mixtures of barium oxide (BaO) and boric oxide or anhydride ($B_2O_3$) or their equivalents, which include (for barium oxide) barium hydroxide, barium carbonate and barium nitrate; and (for boric oxide) boric acid ($H_3BO_3$). Some have also been prepared by precipitation reactions in aqueous solutions.

The specific barium borates to the use of which the present invention is directed comprise the compounds represented as combinations of one molecular proportion of barium oxide (BaO) with from 1 to 2 molecular proportions of boron oxide ($B_2O_3$), and have a barium oxide (BaO) content between approximately 52.4 percent and approximately 68.8 percent, which includes the barium metaborate and barium tetraborate represented in the foregoing list as well as barium borosilicate and intermediate compounds or mixtures of one or more of these compounds. These barium borates may be regarded as mineral pigments or salts and may be in crystalline or amorphous (glassy) form but, for use as constituents of the paint compositions of the present invention, are in comminuted or particulate form, comparable in particle size to that of the other pigments with which they are formulated.

Barium metaborate and barium tetraborate, which are species of preservative for use in the paint compositions of my invention, may also be made by fusion, as stated hereinbefore, or preferably by known methods of neutralization of aqueous solutions of barium hydroxide and boric acid, or by metathetical reaction of a barium salt with an alkali-metal borate. The molecular proportion of water of crystallization of the resulting salt will be dependent upon the particular crystallization temperature, concentration, and conditions prevailing. This water of crystallization may be expelled by heating but, insofar as the invention is concerned, its presence does not decrease the effectiveness of the barium borate in the coating composition or film. The other barium borates are generally more conveniently prepared by fusion of the requisite proportions of barium oxide or equivalent compound and boron oxide in its equivalent.

In accordance with the process of my invention, a barium borate in particulate or powdered form is added to a conventional paint composition in an amount between approximately 2 and approximately 20 percent by weight of the paint, preferably in an amount in excess of 4 percent and, between 8 and 20 percent by weight for optimum results with paints in which titanium dioxide pigments are the principal hiding pigments. The barium borate is then distributed throughout the composition in the same manner as are the other pigment components.

GENERAL TEST PROCEDURE

In the examples which follow, one of the coating compositions which was used and is designated paint MC–2 has the following formula:

| Component: | Percent by weight |
|---|---|
| Rutile titanium dioxide (Ti-Pure R–610) | 14.6 |
| Magnesium silicate (Nytal 300) | 38.9 |
| Alkali-refined linseed oil | 31.1 |
| X-bodied linseed oil | 10.7 |
| Driers: | |
| Lead naphthenate (24 percent Pb) | 1.2 |
| Cobalt naphthenate (6 percent Co) | 0.3 |
| Mineral spirits | 3.2 |

Paint MC–2 is one of the most blister-, fume-, and stain-resistant, and potentially durable exterior white paints known. It is free from zinc oxide, except for the small amount combined in the rutile titanium dioxide pigment. It is highly susceptible to attack by molds. If it were possible to protect it against the growth of molds and associated dirt collection by use of preservatives, and increase its whiteness, it would undoubtedly be regarded as an ideal exterior white paint. However, it has required prohibitive amounts of heretofore known preservatives to protect it against mold growth and associated dirt collection and it has a slightly yellow undertone.

A stock of paint MC–2 containing 20 percent by weight of the preservative was prepared by adding 20 parts by weight of the preservative to 80 parts by weight of the paint having the foregoing formula and passing the resulting paint through a Morehouse mill. Paints containing respectively 1, 2, 4, 6, 8, 10, 12, 14, 16, and 18 percent by weight of the preservative were then prepared by mixing together paint MC–2 with aliquot portions of the stock paint containing 20 percent by weight of preservative. Thus, a paint containing 1 percent by weight of preservative was made by mixing together 380 grams of paint MC–2 and 20 grams of stock paint containing 20 percent by weight of preservative. Each of these paints containing different proportions (from 1 to 20 percent) of preservative were then brushed on wood test panels of ponderosa pine sapwood or redwood heartwood. The first coat then was allowed to dry from 2 to 4 days, after which a second coat of the same composition was applied by brushing. The panels then were placed on test fences and subjected to both north and south outdoor exposure. The test fences departed 5 degrees from vertical and each panel was offset from the one above it by about ¼ inch. Transfer of preservative by rain from the panel above to the one below was thereby reduced to a minimum, since water from each higher panel drained behind the one below instead of over the surface of it.

On each test panel, an area was also painted with the original paint to which no preservative had been added to serve as a control and constitute a basis for comparison on each particular panel. Preliminarily rusted pieces of iron screen approximately 2 inches long and 1⅜ inches wide were affixed with iron tacks to both the test and control areas of some of the panels.

Two panels of each test paint composition were placed on the racks on the fences facing each other, one exposed to the south and the other exposed to the north. Paint films subjected to north exposure at Memphis, Tennessee, normally mold more rapidly than those exposed to the south, while those exposed to the south normally fail sooner by cracking, checking, flaking, or chalking. The panels were each observed at regular intervals and were graded comparatively to the control areas for whiteness, mold growth and dirt collection, chalking, and iron stain, as well as for failure of any kind, and general appearance. This test procedure is comparable to those in general use in the paint industry and, in its essentials, to the procedure of the American Society for Testing Materials (ASTM Standard D 1006-51 T).

In grading mold resistance, two general types of mold growth are recognized on paint films. One type of growth appears to the unaided eye as distinct spots, 0.5 millimeter or more in diameter, which are the result of the development of a mat of mold mycelium on the surface of the paint film. The other type appears to the unaided eye as a general darkening of the surface caused by a large number of dark brown to black spore clusters. A 20 × magnifier (magnification 20 diameters), supplemented by a stereoscopic microscope providing magnifications of 60 to 150 ×, was employed to differentiate between the spore-cluster type of mold growth and un-associated dirt. The mycelium type is most frequently illustrated in textbooks but is the much less frequently occurring type on paint films. The number of spots of the mycelium type of mold growth per square inch was counted with the unaided eye. The mold-resistance ratings for the spore-cluster type of mold growth were determined by estimating the density of this growth as observed with the 20 × magnifier. In order to characterize the ratings further, the number of spore clusters was determined by counting those visible through a 0.76 millimeter diameter hole in a metal plate under a magnification of 60 ×. Descriptions of the amounts of each of the two types of mold growth represented by the different mold-resistance ratings are given in the following table:

| Mold-resistance rating | Amount of mold growth | |
|---|---|---|
| | Mycelium type | Spore-cluster type |
| 10 | None | None. |
| 9 | Suspicious | Suspicious. |
| 8 | Definite traces | 1 to 5. |
| 7 | 1 to 2 | 5 to 25. |
| 6 | 3 to 4 | 25 to 45. |
| 5 | 5 to 7 | 45 to 65. |
| 4 | 8 to 12 | 65 to 90. |
| 3 | 12 to 20 | 90 to 120. |
| 2 | More than 20 | 120 to 160. |
| 1 | Very dense growth | 160 to 200. |
| 0 | Heavy growth visually extending outward from the surface (furry). | Greater than 200. |

Grading for chalk resistance was conducted in accordance with the procedure outlined in ASTM Standard D 659-44 with the exception that chalk-resistance ratings from 10 (no chalking) to 1 (maximum chalking) were used and black velvet was only employed to check readings taken with the fingertip.

In the following examples and elsewhere in this specification, reference is made to whiter films and to differences in appearance between the control and test films. Although the actual differences in this respect are distinct, they nonetheless are difficult to describe. To express differences in whiteness an index of whiteness has been proposed which is composed of three individual factors influencing whiteness that are respectively: (1) reflectance, (2) hue, and (3) saturation. However, the interrelationships between these factors are not clearly understood and, in this specification, statements about whiteness are based on a visual comparison of the same paints without preservative (control) and with different concentrations of the preservatives which are the subject of this invention.

The invention is further described in connection with the following examples and comparative examples. It is to be understood that, since many compositions conforming to the invention have been prepared and tested, these examples are merely selected for purposes of illustration and are consequently not to be construed as limitative.

EXAMPLES

*Example 1.—Paint MC-2 containing barium metaborate*

Compositions were prepared from paint MC-2 and various proportions of a barium metaborate having the Berzelian formula $BaO \cdot B_2O_3$, prepared by fusion of barium carbonate and anhydrous boric acid ($H_3BO_3$) in such molecular proportions (viz., 1:2) as to give the desired barium metaborate. The fused mass was then ground to a fineness such that all particles passed a 100-mesh screen and consequently were 100-mesh or finer in size.

The powdered barium metaborate was then dispersed in paint MC-2 to give compositions containing 1, 2, 4, 6, 8, 10, 12, 14, 16, 18, and 20 percent by weight of preservative, as described hereinbefore, and coated panels were prepared and exposed as hereinbefore described. Paint MC-2 containing no barium metaborate had a viscosity of 84 Krebs units at 25° C. while those containing 10 and 20 percent of barium metaborate had viscosities at 25° C. of respectively 89 and 91 Krebs units.

When the panels were painted, it was observed that the paint films containing preservative were whiter than the control films and that their whiteness increased with increasing concentration of the preservative in the film.

The following table gives the mold- and chalk-resistance ratings for the paint films of the control areas which contained no preservative and the paint films which contained different amounts of barium metaborate after exposures to both the north and south for 7 months and 1 year:

| Barium metaborate concentration | Mold-resistance rating after exposure for 7 mo. and 1 yr. to— | | | | Chalk-resistance rating after exposure for 1 yr. to— | |
|---|---|---|---|---|---|---|
| | North | | South | | North | South |
| | 7 mo. | 1 yr. | 7 mo. | 1 yr. | | |
| Percent by weight: | | | | | | |
| 0 (control) | 5 | 2 | 6 | 3 | 9 | 7 |
| 1 | 5 | 2 | 7 | 3 | 9 | 7 |
| 2 | 6 | 3 | 7 | 3 | 9 | 7 |
| 4 | 6 | 4 | 8 | 5 | 9 | 7 |
| 6 | 7 | 5 | 8 | 6 | 9 | 7 |
| 8 | 7 | 5 | 9 | 6+ | 9 | 8 |
| 10 | 7 | 6 | 9 | 7 | 9 | 8 |
| 12 | 8 | 6 | 9 | 8 | 10 | 8 |
| 14 | 8 | 7 | 9 | 8+ | 10 | 9 |
| 16 | 8 | 8 | 9 | 8+ | 10 | 9 |
| 18 | 8+ | 8+ | 9 | 8+ | 10 | 9 |
| 20 | 8+ | 8+ | 9 | 8+ | 10 | 9 |

The dirt collection on the panels closely followed the pattern of mold growth, both on the northern and southern exposures. There was less dirt on the panels containing 4 percent or more preservative than on the control panels in all cases. This observed improvement is not attributable to increased chalking, since the chalk-resistance ratings show the control and paints containing the lower concentrations of preservative chalked to a slightly greater degree than did those containing the higher concentrations.

No cracking either on the control or on the test areas was observable at the end of one year.

In general appearance, all panels coated with paints containing 4 percent or more preservative were better than the control. The preservative did not decrease the good resistance of this paint film to iron staining.

*Example 2.—Paint MC-2 containing barium tetraborate*

Compositions were prepared consisting of paint MC-2 and various proportions of powdered barium tetraborate having the Berzelian formula $BaO.2B_2O_3$, which was prepared by fusion of 4 molecular proportions of boric acid ($H_3BO_3$) with 1 molecular proportion of barium carbonate. Panels were then coated and exposed at the same time as those described in Example 1 hereinbefore. The mold- and chalk-resistance ratings are given in the following table:

| Barium tetraborate concentration | Mold-resistance rating after exposure for 7 mo. and 1 yr. to— | | | | Chalk-resistance rating after exposure for 1 yr. to— | |
|---|---|---|---|---|---|---|
| | North | | South | | North | South |
| | 7 mo. | 1 yr. | 7 mo. | 1 yr. | | |
| Percent by weight: | | | | | | |
| 0 (control) | 5 | 2 | 6 | 3 | 9 | 7 |
| 1 | 5 | 2 | 6 | 3 | 9 | 7 |
| 2 | 6 | 2 | 6 | 3 | 9 | 7 |
| 4 | 6 | 3 | 6 | 5 | 9 | 7 |
| 6 | 6 | 4 | 7 | 5 | 9 | 7 |
| 8 | 7 | 5 | 7 | 6 | 9 | 8 |
| 10 | 7 | 6 | 7 | 6 | 9 | 8 |
| 12 | 7 | 6 | 8 | 7+ | 10 | 8 |
| 14 | 7 | 7 | 8 | 8 | 10 | 9 |
| 16 | 8 | 8 | 8 | 8 | 10 | 9 |
| 18 | 8 | 8 | 9 | 8 | 10 | 9 |
| 20 | 8 | 8+ | 9 | 8+ | 10 | 9 |

Dirt collection was about the same as on the panels of Example 1 containing the barium metaborate preservative at 7 months and 1 year.

The increased whiteness that was noted heretofore in connection with the paints containing the barium metaborate preservative was also noted in connection with the paint films of this example. The decreased chalking observed for paint films containing the preservative, the absence of cracking, and the general appearance were also about the same as the panels of Example 1 containing barium metaborate preservative. The resistance of the paint films to iron staining was not impaired by the presence of the preservative in the film.

*Example 3.—Paint MC-2 containing barium borosilicate*

Compositions were prepared consisting of paint MC-2 and various proportions of a powdered barium borosilicate, having the Berzelian formula $3BaO \cdot 3B_2O_3 \cdot 2SiO_2$, prepared by fusion of barium carbonate, boric acid ($H_3BO_3$) and silica in the molecular proportions of 3:6:2, respectively. Panels then were coated and exposed. The mold- and chalk-resistance ratings were as follows:

| Barium borosilicate concentration | Mold-resistance rating after exposure for 8 mo. and 1 yr. to— | | | | Chalk-resistance rating after exposure for 1 yr. to— | |
|---|---|---|---|---|---|---|
| | North | | South | | North | South |
| | 8 mo. | 1 yr. | 8 mo. | 1 yr. | | |
| Percent by weight: | | | | | | |
| 0 (control) | 5 | 2 | 6 | 3 | 9 | 7 |
| 1 | 6 | 2 | 7 | 3 | 9 | 7 |
| 2 | 7 | 3 | 7 | 4 | 9 | 7 |
| 4 | 8 | 4 | 8 | 4 | 9 | 7 |
| 6 | 8 | 5 | 8 | 5 | 9 | 7 |
| 8 | 8 | 5 | 8 | 6 | 9 | 8 |
| 10 | 8 | 6 | 8 | 7 | 9 | 8 |
| 12 | 9 | 6 | 9 | 7 | 10 | 8 |
| 14 | 9 | 7 | 9 | 8 | 10 | 9 |
| 16 | 9 | 8 | 9 | 8 | 10 | 9 |
| 18 | 9 | 8+ | 9 | 8+ | 10 | 9 |
| 20 | 9 | 8+ | 9 | 8+ | 10 | 9 |

The panels in general appearance were quite like those in Examples 1 and 2 and a comparable increase in whiteness was observed. The chalk-resistance ratings were the same as found in connection with Example 2. The resistance of the films to iron staining was not impaired by the presence of the preservative.

*Example 4.—Paint MC-2B containing precipitated barium metaborate*

In this example, a paint was used which was designated MC-2B, which differs from paint MC-2 used in the preceding examples only in the substitution of a zinc oxide-free rutile titanium dioxide pigment designated as Ti-Pure R-510 in place of Ti-Pure R-610. A precipitated barium metaborate, which was prepared by addition of an aqueous borax solution to a concentrated aqueous solution of barium sulfide heated to 75° C., was used as the test preservative. In all other respects the mixing to produce paints containing various proportions of this precipitated barium metaborate and their testing were performed as described in Example 1, and therebefore. The ratings of mold and chalk resistance after an exposure of 6 months were as follows:

| Barium metaborate concentration | Mold-resistance rating after exposure for 6 mo. to— | | Chalk-resistance rating after exposure for 6 mo. to— | |
|---|---|---|---|---|
| | North | South | North | South |
| Percent by weight: | | | | |
| 0 (control) | 4 | 5 | 10 | 9 |
| 1 | 4 | 5+ | 10 | 9 |
| 2 | 4+ | 7 | 10 | 9 |
| 4 | 5 | 8 | 10 | 9 |
| 6 | 6+ | 8+ | 10 | 9 |
| 8 | 8 | 9 | 10 | 9 |
| 10 | 9 | 9 | 10 | 10 |
| 12 | 9 | 10 | 10 | 10 |
| 14 | 9 | 10 | 10 | 10 |
| 16 | 9 | 10 | 10 | 10 |
| 18 | 9 | 10 | 10 | 10 |
| 20 | 9 | 10 | 10 | 10 |

The dried films of these paints were in every respect the equivalents of those of Example 1 at that time, especially with respect to mold control. Chalking had only started to take place at the end of the exposure period of 6 months. The films containing the precipitated barium metaborate had an equal or greater resistance to iron staining than the control at the end of the exposure period.

*Examples directly comparable to Examples 1, 2, and 3.— Related compounds in paint MC-2*

In the following table appear the results obtained on exposure of panels coated with films of paint MC-2 and containing various other compounds which were tested as preservatives, as well as results already described in the foregoing examples so that comparisons can be made more readily. These results are listed under the headings "north" and "south" exposures. Under each heading, the first figure represents the lowest concentration in percent by weight of the particular compound that was required to produce a paint whose films were perceptibly freer from mold than the control after the exposure period of 1 year, while the second figure represents the lowest concentration in percent by weight of the particular compound that was required to produce a paint whose film was essentially but not completely mold-free (namely, a mold-resistance rating of 8 or better) at the end of the same period of exposure. A percentage indicated as "over 20" should be understood to mean simply that, with 20 percent of the specified compound, which was the highest concentration tested and was regarded as the practical upper limit, the mold growth was greater than that which would be rated as 8. Between these two percentages, the effectiveness of mold control can be said to be increasing with increasing concentrations of the compound. Beyond the second value specified, additional proportions of the compound may not produce a proportional improvement in control.

The chalk-resistance ratings, which are listed in three columns, are based upon the chalking condition that was determined by the fingertip method described hereinbefore and represent the condition prevailing at the end of the one-year exposure period. The chalk-resistance ratings are for the control film and films containing respectively 10 and 20 percent by weight of the specified compound.

unusual characteristics of certain of the films that were noted in the exposure tests also are indicated in the following table directly below the mold- and chalk-resistance ratings:

| Compound | Amount of compound required to decrease mold growth and amount required to provide a mold-resistance rating of 8 after exposure for 1 yr. to— | | Chalk-resistance rating after exposure for 1 yr. to the south for— | | |
|---|---|---|---|---|---|
| | North—Percent by weight | South—Percent by weight | Control | 10 percent of compound | 20 percent of compound |
| Barium metaborate $BaO \cdot B_2O_3$ (Example 1) | 2-16 | 4-12 | 7 | 8 | 9 |
| | Films with preservative whiter than control | | | | |
| Barium tetraborate $BaO \cdot 2B_2O_3$ (Example 2) | 4-16 | 4-14 | 7 | 8 | 9 |
| | Films with preservative whiter than control | | | | |
| Barium borosilicate $3BaO \cdot 3B_2O_3 \cdot 2SiO_2$ (Example 3) | 2-16 | 2-14 | 7 | 8 | 9 |
| | Films with preservative whiter than control | | | | |
| Barium octaborate $BaO \cdot 4B_2O_3$ | 2-over 20 | 2-16 | 7 | 8 | 8 |
| | Films with compound whiter than control | | | | |
| Barium orthoborate $3BaO \cdot B_2O_3$ | 4-18 | 2-12 | 7 | 9 | 8 |
| | All films containing the compound had a pink tone | | | | |
| Barium oxide $BaO$ | 4-20 | 4-14 | 7 | 8 | 8 |
| | A white granular powder similar to chalk formed within a week on surfaces of all films, the amount increasing with increasing concentration of the compound. | | | | |
| Boric acid $H_3BO_3$ | 14-over 20 | 14-over 20 | 6 | 7 | 7 |
| Barium carbonate $BaCO_3$ | 10-over 20 | 8-over 20 | 7 | 7 | 7 |
| Barium sulfate $BaSO_4$ | over 20-over 20 | over 20-over 20 | 7 | 7 | 7 |
| Barium fluoroborate $BaBF_8$ | 16-over 20 | 10-over 20 | 7 | 7 | 7 |
| Barium silicofluoride $BaSiF_6$ | 10-over 20 | 10-over 20 | 7 | 7 | 7 |
| Anhydrous borax $Na_2B_4O_7$ | 4-over 20 | 2-over 20 | 7 | 6 | 6 |
| | The surfaces of the films were tacky to touch during a highly humid atmospheric condition three days after their initial exposure. Paint containing higher concentrations applied to redwood was discolored, presumably by the solubilization of extractives from the wood. | | | | |
| Colemanite $2CaO \cdot 3B_2O_3 \cdot 5H_2O$ | 4-over 20 | 4-18 | 7 | 7 | 8 |
| Mixture of 50 percent barium oxide and 50 percent boric acid | 8-over 20 | 4-over 20 | 7 | 7 | 7 |
| Mixture of 50 percent barium carbonate and 50 percent boric acid | 8-over 20 | 2-over 20 | 7 | 7 | 7 |
| Mixture of 50 percent barium sulfate and 50 percent borax (decahydrate) | 20-over 20 | over 20-over 20 | 7 | 7 | 7 |
| Mixture of 50 percent barium carbonate and 50 percent borax (decahydrate) | 6-over 20 | 2-over 20 | 7 | 7 | 7 |

As hereinbefore stated, paint MC-2 is highly susceptible to attack by molds. The results in the table hereinafter show that the specified preservatives of this invention greatly increased the resistance of paint MC-2 to disfigurement by molds and associated dirt collection. In contrast, the results for related compounds, such as barium fluoroborate and barium silicofluoride, which would be expected to be more effective against molds based on knowledge from other fields, were markedly inferior for the control of mold growth and associated dirt collection on paint MC-2. Moreover, the beneficial results of the specified preservatives from the standpoint of mold control and associated dirt collection were combined with an increased chalk resistance of the films containing these preservatives and there was a progressively decreasing chalking rate with increasing concentration. Paint MC-2 is one which normally deposits a film that is regarded as very chalk resistant. Its rating, however, is only 7 on the scale used after an exposure period of 1 year and most of the other compounds tested produced little or no change in the chalking rate. In some cases, they even accelerated it, as shown by a comparison of the rating of the control with those for the films containing 10 and 20 percent of the compounds. Other

*Example 5.—Paint A containing barium metaborate and barium tetraborate*

To a paint, designated paint A, having the composition set forth in the table hereinafter, were added, as described in the general test procedure hereinbefore, such quantities of barium metaborate and barium tetraborate, respectively, as to give preservative concentrations of 6, 8, and 12 percent by weight of the paint. The paint compositions containing the different preservatives in the concentrations noted were then applied to wood test panels (two coats) and exposed on test fences at Memphis, Tennessee, as hereinbefore described.

| Component: | Percent by weight |
|---|---|
| Anatase titanium dioxide (Ti-Pure FF) | 6.9 |
| Rutile titanium dioxide (Ti-Pure R-6.10) | 6.9 |
| Calcium carbonate (York Whiting Grade A) | 55.5 |
| Alkali-refined linseed oil | 17.2 |
| X-bodied linseed oil | 5.7 |
| M-25 linseed oil | 0.1 |
| Driers: | |
| Lead naphthenate (24 percent Pb) | 0.6 |
| Cobalt naphthenate (6 percent Co) | 0.1 |
| Soya lecithin | 0.3 |
| Mineral spirits | 6.7 |

The mold- and chalk-resistance ratings at the end of one year of exposure for each of the compositions were as follows:

| Preservative and concentration | Mold-resistance rating after exposure for 1 yr. to— || Chalk-resistance rating after exposure for 1 yr. to— ||
|---|---|---|---|---|
| | North | South | North | South |
| Percent by weight: | | | | |
| 0 (control) | 5 | 7 | 5 | 3 |
| Barium metaborate: | | | | |
| 6 | 7 | 8 | 8 | 7 |
| 8 | 8 | 8 | 9 | 7 |
| 12 | 8+ | 8+ | 10 | 8 |
| Barium tetraborate: | | | | |
| 6 | 7 | 8 | 8− | 6 |
| 8 | 8 | 8 | 9 | 7 |
| 12 | 8 | 8+ | 10 | 8 |

Paint A is representative of coating compositions containing a mixture of anatase and rutile titanium dioxides as the hiding pigments, and calcium carbonate as the extender pigment, in a conventional linseed oil vehicle. Such compositions differ from paint MC-2 in that they contain anatase which promotes chalking. Paints of this type are blister- and fume-resistant. They are not as susceptible to attack by molds as paint MC-2. However, they are prematurely disfigured by mold growth and associated dirt collection. Because of the presence of the maximum-chalking anatase, they also are subject to premature failure by chalking. The film yellows more severely after exposure than that of paint MC-2.

With respect to the films of this example containing the specified barium borates, each of them was and remained cleaner and whiter than the control. During the exposure period, the control yellowed. The initiation of chalking of the films was delayed and the chalking rate was retarded. The films containing the specified barium borates had a resistance to iron staining equal to the control.

*Example 6.—Paint B containing barium metaborate and barium tetraborate*

To a paint, designated paint B, having the composition set forth hereinafter, were added, as in Example 5 hereinbefore, barium metaborate and barium tetraborate, respectively, each in proportions of 6, 8, and 12 percent by weight.

Component: Percent by weight
- Anatase titanium dioxide (Ti-Pure FF) _____ 16.8
- Magnesium silicate (Asbestine 3X) _____ 34.6
- Q-bodied linseed oil _____ 36.6
- Driers:
  - Lead naphthenate (24 percent Pb) _____ 0.9
  - Cobalt naphthenate (6 percent Co) _____ 0.1
- Mineral spirits _____ 11.0

The mold- and chalk-resistance ratings at the end of one year of exposure for each of the paints were as follows:

| Preservative and concentration | Mold-resistance rating after exposure for 1 yr. to— || Chalk-resistance rating after exposure for 1 yr. to— ||
|---|---|---|---|---|
| | North | South | North | South |
| Percent by weight: | | | | |
| 0 (control) | 3 | 5 | 5 | 5 |
| Barium metaborate: | | | | |
| 6 | 7 | 8 | 7 | 6 |
| 8 | 7 | 8+ | 8 | 6 |
| 12 | 8 | 8+ | 9 | 8 |
| Barium tetraborate: | | | | |
| 6 | 7 | 8 | 6 | 6 |
| 8 | 7 | 8+ | 8 | 6 |
| 12 | 8 | 8+ | 9 | 7 |

This example illustrates a paint employing a maximum-chalking anatase titanium dioxide as the hiding pigment in contrast to paint A which contains chalk-resistant rutile titanium dioxide as well as anatase. In addition, magnesium silicate is used as the extender in place of the calcium carbonate used in paint A.

Paint B differs from paint MC-2 in that the anatase titanium dioxide used in paint B is the maximum-chalking type rather than the rutile titanium dioxide used in paint MC-2, which was of the minimum-chalking type. Films of paint B consequently chalk sooner after exposure and at a faster rate than films of paint MC-2.

The paint film is about as equally susceptible to attack by molds as the film of paint MC-2 but somewhat more susceptible than that of paint A. It is disfigured by molds and associated dirt and has an excessive chalking rate. After chalking starts, discrete spots of mycelium-type mold growth remain to disfigure the surface. The paint film fails completely in one to two years because of its high chalking rate.

Addition of the barium borates as specified to paint B resulted in a film resistant to attack by molds and the paint was cleaner and whiter than the control. The chalking on the test areas was greatly retarded.

This example and Example 1 show that the use of 12 percent of barium metaborate with maximum-chalking anatase titanium dioxide pigment provides a paint film equivalent in chalk resistance after an exposure of one year to a paint film containing minimum-chalking rutile titanium dioxide pigment. The extender pigment and the vehicle are comparable in these two examples.

The amount of iron staining on the films was not influenced by the presence of the barium borates.

*Example 7.—Paint D containing barium metaborate and barium tetraborate*

The vehicle of paint D is an oil varnish consisting of a long-oil glyceryl-phthalate alkyd resin (G-E 7321 Glyptal) produced by General Electric Company. It is a very long linseed oil composition designed for use as a vehicle for making exterior paints. It is particularly suited for use in lead-free and zinc oxide-free paint formulations in which blister, stain, and fume resistance are primary requirements. The resin has a Gardner-Holdt viscosity between V and X, and, when diluted with mineral spirits to a solids content of 76.5 percent by weight, its viscosity is reduced to between C and E.

Paint D having the composition specified hereinbelow was prepared from this alkyd resin. To portions of this paint were then added barium metaborate and barium tetraborate in amounts such as to produce paints containing 6, 8, and 12 percent by weight of the respective preservatives and these were then applied to wood panels and subjected to exposure on test fences as described hereinbefore.

Component: Percent by weight
- Rutile titanium dioxide (Ti-Pure R-610) _____ 3.2
- Anatase titanium dioxide (Ti-Pure FF) _____ 13.1
- Magnesium silicate (Nytal 300) _____ 31.3
- Oil varnish (Glyptal G-E 7321) _____ 37.4
- Driers:
  - Lead naphthenate (24 percent Pb) _____ 0.9
  - Cobalt naphthenate (6 percent Co) _____ 0.2
- Dipentene _____ 1.6
- Mineral spirits _____ 12.3

The mold- and chalk-resistance ratings after an exposure of 1 year were as follows:

| Preservative and concentration | Mold-resistance rating after exposure for 1 yr. to— || Chalk-resistance rating after exposure for 1 yr. to— ||
|---|---|---|---|---|
| | North | South | North | South |
| Percent by weight: | | | | |
| 0 (control) | 3 | 7 | 6 | 5 |
| Barium metaborate: | | | | |
| 6 | 7 | 8 | 10 | 9 |
| 8 | 8 | 8+ | 10 | 10 |
| 12 | 8 | 8+ | 10 | 10 |
| Barium tetraborate: | | | | |
| 6 | 7 | 8 | 9 | 7 |
| 8 | 8 | 8 | 10 | 9 |
| 12 | 8 | 8+ | 10 | 10 |

Paint D is similar to paint MC-2 in that it contains titanium dioxide as the hiding pigment and magnesium silicate as the extender, but the vehicle is an oil varnish of the alkyd-resin type. Only 20 percent of its titanium dioxide content is minimum-chalking rutile, which is the hiding pigment of paint MC-2; the remainder of the titanium dioxide, which is the greater proportion, is a maximum-chalking anatase. The film has a greater than optimum chalking rate. The long-oil alkyd-resin vehicle provides a faster drying, harder, more durable film.

This paint is subject to attack by molds, as shown in the foregoing table, and is further disfigured by collection of associated dirt.

Addition of the specified barium borates to this paint produced a film which was resistant to attack by molds. The preserved films were whiter and remained cleaner than the control. The film on the control at the end of one year of exposure was chalking at an excessive rate, whereas the films containing the specified barium borates had not started to chalk except those containing the lower concentrations of the preservatives. The iron staining characteristics of the films were not significantly altered by the specified barium borates.

*Example 8.—Paint E containing barium metaborate and barium tetraborate*

Paint E, having the composition specified hereinafter, was formulated with an oil varnish prepared by reaction of tall-oil fatty acids (Actinol FA #2; for analysis see the book of Henry Fleming Payne, Organic Coating Technology, vol. 1, Oils, Resins, Varnishes, and Polymers, New York, John Wiley Sons, Inc., page 107), isophthalic acid, and pentaerythritol, so that the resulting alkyd oil contained 15 percent by weight of pentaerythritol isophthalate and 85 percent of the pentaerythritol esters of tall-oil fatty acids. Such a product had a Gardner-Holdt viscosity between Z3 and Z4 and an acid number of 4.5 (milligrams of potassium hydroxide per gram). The composition of paint E was as follows:

| Component: | Percent by weight |
|---|---|
| Anatase titanium dioxide (Ti-Pure FF) | 12.9 |
| Rutile titanium dioxide (Ti-Pure R-610) | 3.2 |
| Magnesium silicate (Nytal 300) | 30.9 |
| Oil varnish (pentaerythritol-isophthalic-tall oil alkyd) | 36.9 |
| Driers: | |
| Lead naphthenate (24 percent Pb) | 0.9 |
| Cobalt naphthenate (6 percent Co) | 0.2 |
| Dipentene | 1.5 |
| Mineral spirits | 13.5 |

Barium metaborate and barium tetraborate then were added to portions of this paint so that compositions containing 6, 8, and 12 percent by weight of each were prepared. These were then coated onto panels and exposed as described hereinbefore. The mold- and chalk-resistance ratings after exposure were as follows:

| Preservative and concentration | Mold-resistance rating after exposure for 1 yr. to— | | Chalk-resistance rating after exposure for 1 yr. to— | |
|---|---|---|---|---|
| | North | South | North | South |
| Percent by weight: | | | | |
| 0 (control) | 3 | 8 | 6 | 5 |
| Barium metaborate: | | | | |
| 6 | 7 | 8 | 9 | 9 |
| 8 | 8 | 8+ | 10 | 10 |
| 12 | 8 | 8+ | 10 | 10 |
| Barium tetraborate: | | | | |
| 6 | 7 | 8 | 9 | 8 |
| 8 | 8 | 8+ | 10 | 9 |
| 12 | 8 | 8+ | 10 | 10 |

Paint E differs from paint MC-2 in that it is less subject to disfigurement by mold and associated dirt and has a higher chalking rate, since 80 percent of the titanium dioxide is in the form of maximum-chalking anatase. Because of the alkyd vehicle, paint E dries faster and harder than paints based on alkali-refined and bodied linseed oil vehicles. However, the chalking rate of this paint is excessive for maximum film life.

Addition of the barium borates as specified to this paint produced a mold-resistant, cleaner and whiter film, and a substantial reduction in chalking rate and retardation of its inception. The resistance to iron staining was the same for the control and the films containing the specified barium borates.

*Example 9.—Paint F containing barium metaborate*

An oil varnish vehicle was prepared for paint F by reacting about 60 percent by weight of soybean oil with about 26 percent of phthalic anhydride and about 14 percent of pentaerythritol. To each 174 pounds of the resulting alkyd resin was added 48 pounds of linseed oil that had been bodied to a Gardner-Holdt viscosity of approximately Z4.

The foregoing vehicle was combined with a minimum-chalking rutile titanium dioxide pigment (Titanox RANC) and calcium carbonate, a small proportion of mica, and driers in the form of lead and cobalt tallates in the quantities specified in the composition hereinafter to produce a paint. To portions of this paint were then added such quantities of barium metaborate to produce compositions containing respectively 8, 10, 12, 16, and 20 percent by weight. These paints were then applied to wood panels and subjected to exposure as described hereinbefore.

| Component | Percent by weight |
|---|---|
| Rutile titanium dioxide (Titanox RANC) | 17.6 |
| Calcium carbonate (Thompson, Weinman & Co. Whiting No. 1) | 35.0 |
| Mica (325-mesh water-ground) | 4.7 |
| Oil varnish (details hereinbefore) | 28.0 |
| Driers: | |
| Lead soaps of tall-oil acids (16 percent Pb) | 1.1 |
| Cobalt soaps of tall-oil acids (6 percent Co) | 0.6 |
| Mineral spirits | 13.0 |

The mold- and chalk-resistance ratings after exposure for 7 months are tabulated hereinafter:

| Barium metaborate concentration | Mold-resistance rating after exposure for 7 mo. to— | | Chalk-resistance rating after exposure for 7 mo. to— | |
|---|---|---|---|---|
| | North | South | North | South |
| Percent by weight: | | | | |
| 0 (control) | 6 | 8 | 10 | 10 |
| 8 | 10 | 10 | 10 | 10 |
| 10 | 10 | 10 | 10 | 10 |
| 12 | 10 | 10 | 10 | 10 |
| 16 | 10 | 10 | 10 | 10 |
| 20 | 10 | 10 | 10 | 10 |

The foregoing paint resembles paint MC-2 only in that titanium dioxide is the hiding pigment and is a minimum-chalking rutile. The extender pigments are calcium carbonate and a small amount of mica in place of magnesium silicate. The vehicle is an alkyd rather than alkali-refined and bodied linseed oil, which provides a faster drying, harder and more durable film than that provided by paint MC-2.

Paint F is subject to attack by molds as indicated in the foregoing table. It is subject to yellowing and additional disfiguration by associated dirt.

Paint F containing barium metaborate produced films that were whiter and more resistant to attack by molds, as shown in the foregoing table. The preserved paint was cleaner and whiter than the control. At the end of 7 months, neither the control nor the treated areas had started to chalk and there was no significant difference in the amount of iron staining.

*Example 10.—Paint G containing barium metaborate*

Paint G, having the composition specified hereinafter, was prepared from a commercial cyclopentadiene-linseed oil copolymer which had an acid number below 2 and whose 70 percent solution in mineral spirits had a Gardner-Holdt viscosity between T and V. This paint is typical of those produced from copolymerized drying and semi-drying oils. Such copolymerized oils are prepared by the reaction of dicyclopentadiene and linseed or other unsaturated oil in which reaction the dicyclopentadiene depolymerizes to cyclopentadiene and adds at unsaturated linkages of the oil. The preparation of such oils by copolymerization with styrene, alphamethylstyrene and cyclopentadiene, is described in the book by Henry Fleming Payne, cited hereinbefore, beginning at page 94.

Barium metaborate was added in amounts corresponding to 8, 10, 12, 16, and 20 percent by weight of the paint and the films were tested as hereinbefore described.

| Component: | Percent by weight |
|---|---|
| Rutile titanium dioxide (Titanox RA 50) | 8.3 |
| Anatase titanium dioxide (Titanox A MO) | 8.3 |
| Magnesium silicate (Asbestine 3X) | 25.7 |
| Cyclopentadiene-linseed oil copolymer (100 percent solids) | 28.6 |
| Mineral spirits (including mineral spirits to dilute copolymer to 70 percent solids) | 28.3 |
| Driers: | |
| Lead naphthenate (24 percent Pb) | 0.5 |
| Cobalt naphthenate (6 percent Co) | 0.2 |
| Antiskinning agent | 0.1 |

The mold- and chalk-resistance ratings obtained after exposure for 8 months were as follows:

| Barium metaborate concentration | Mold-resistance rating after exposure for 8 mo. to— | | Chalk-resistance rating after exposure for 8 mo. to— | |
|---|---|---|---|---|
| | North | South | North | South |
| Percent by weight: | | | | |
| 0 (control) | 5 | 8− | 5 | 4 |
| 8 | 5 | 8 | 9 | 9 |
| 10 | 7+ | 9 | 10 | 10 |
| 12 | 8+ | 9 | 10 | 10 |
| 16 | 10 | 9 | 10 | 10 |
| 20 | 10 | 10 | 10 | 10 |

Two different titanium dioxide pigments were used in the foregoing paint as the hiding pigments and magnesium silicate was the extender pigment. This paint differs from paint MC-2 in that half the titanium dioxide is freely chalking anatase and the vehicle is linseed oil that has been modified by reaction with cyclopentadiene to provide a faster drying, harder film having greater resistance to water and alkali. The chalking rate is greater than desirable for good film life.

Addition of barium metaborate to this paint resulted in a film that was resistant to attack by molds as shown in the foregoing table. The films of the preserved paint were cleaner and whiter than the control. The films on the control areas had started chalking before 8 months, but films containing barium metaborate had not chalked at the end of 8 months with the exception of those containing the lowest concentration of the preservative. The iron-staining resistance of the films containing barium metaborate was not adversely influenced compared to the control.

*Example 11.—Paint H containing barium metaborate*

Paint H, having the composition specified hereinafter, was formulated to include a basic white lead silicate pigment and an oil varnish of the long-oil soya-modified alkyd type conforming to Federal (U. S.) Specification TT-R-266, Type I, Class A. To portions of this paint were then added such amounts of barium metaborate as to produce compositions containing 8, 10, 12, 16, and 20 percent by weight of the paint. These paints were then subjected to exposure tests as described hereinbefore.

| Component: | Percent by weight |
|---|---|
| Anatase titanium dioxide (Titanox AA) | 18.7 |
| Basic white lead silicate (Dutch Boy 45 X) | 7.5 |
| Magnesium silicate (Nytal 200) | 27.2 |
| Raw linseed oil | 16.9 |
| Oil varnish (Fed. Spec. TT-R-266, Type I, Class A) | 24.2 |
| Driers: | |
| Lead naphthenate (24 percent Pb) | 0.7 |
| Manganese naphthenate (6 percent Mn) | 0.3 |
| Mineral spirits | 4.5 |

The mold- and chalk-resistance ratings, after exposure for 8 months, are tabulated in the table which follows:

| Barium metaborate concentration | Mold-resistance rating after exposure for 8 mo. to— | | Chalk-resistance rating after exposure for 8 mo. to— | |
|---|---|---|---|---|
| | North | South | North | South |
| Percent by weight: | | | | |
| 0 (control) | 3 | 4 | 8 | 7− |
| 8 | 6+ | 8+ | 9 | 8 |
| 10 | 7+ | 9 | 10 | 9 |
| 12 | 8+ | 10 | 10 | 9 |
| 16 | 9 | 10 | 10 | 10 |
| 20 | 10 | 10 | 10 | 10 |

The foregoing paint composition differs from paint MC-2 in that the titanium dioxide is maximum-chalking anatase rather than minimum-chalking rutile and basic white lead silicate is also included as a hiding pigment. The vehicle of this paint differs from that of paint MC-2 only in supplementation of the linseed oil with the long-oil soya-modified alkyd resin, which results in a faster drying, harder film. The chalking rate of the paint film is greater than optimum.

Addition of barium metaborate to this paint produced a film that was resistant to attack by molds, as shown in the foregoing table. The preserved paint was also cleaner and whiter than the control. The chalking of the films containing barium metaborate was distinctly retarded and those films containing the higher concentrations had not started to chalk at the end of 8 months. There was no significant difference in the amount of iron staining of the films containing barium metaborate compared to the control at the end of the exposure period.

While the use of the preservatives of my invention has been illustrated with white paints, they are also useful in colored paints. For example, paint MC-2, referred to hereinbefore, is a good tint base to which mineral pigment colors and organic toners can be added to produce colored paints. Satisfactory colored paints have been produced with a tint base of this type containing the specified preservatives. Those organic toners and mineral pigment colors which are used should be resistant to mild alkali. Examples are carbon black, lampblack, graphite, ultramarine blue, alkali-resistant iron blue, copper phthalocyanine blue, chromium oxide green, hydrated chromium oxide green, polychlor phthalocyanine green, inorganic maroon, cadmium maroon, toluidine red, toluidine yellow, cadmium yellow, Hansa yellow, chrome orange, molybdate orange, raw sienna, burnt sienna, burnt umber, and iron oxide.

Extender pigments, besides the magnesium silicates, calcium carbonates, and mica that are referred to in the foregoing description, which may be used in the paints of my invention include silica, diatomaceous silica, hydrated aluminum silicates (clays and pyrophyllite), calcium silicates, barium sulfate (ground barytes and blanc fixe), calcium sulfate and the like.

Although my invention is described with particular reference to white and colored paint compositions containing titanium dioxides as the principal hiding pigments, it is to be understood that paint compositions containing other hiding pigments, such as zinc sulfide, lithopones, and titanated lithopones, are included within the scope of my invention.

Inasmuch as the foregoing description comprises preferred embodiments of my invention, which were selected solely for purposes of illustration, it is to be understood that variations and modifications may be made therein, particularly with respect to the components of the paint and their proportions, without departing from the spirit or scope of the invention and that consequently the invention is restricted only by the purview of the appended claims.

I claim:

1. A paint consisting eessentially of a pigment, a vehicle of the group consisting of film-forming drying oils, oil varnishes, and oil-modified alkyd resins, and containing dispersed therein in particulate form, a barium borate having a barium oxide content between approximately 52.4 and approximately 68.8 percent by weight.

2. A paint as defined in claim 1 in which the amount of barium borate is sufficient to impart to the film deposited therefrom increased resistance to disfiguration by mold growth and associated dirt collection.

3. A paint as defined in claim 1 in which the amount of barium borate is between approximately 2 and approximately 20 percent by weight of the paint.

4. A paint as defined in claim 1 in which the barium borate is selected from the group consisting of barium metaborate, barium tetraborate, and barium borosilicate in an amount between approximately 2 and approximately 20 percent by weight of the paint.

5. A paint as defined in claim 4 in which the barium borate is barium metaborate.

6. A paint as defined in claim 4 in which the barium borate is barium tetraborate.

7. A paint as defined in claim 4 in which the barium borate is barium borosilicate.

8. A paint as defined in claim 1, the pigment component of which includes a titanium dioxide pigment and the barium borate is present in an amount sufficient to impart to the film deposited therefrom increased resistance to chalking.

9. A paint as defined in claim 1, the pigment component of which includes an anatase titanium dioxide pigment and the barium borate is present in an amount sufficient to impart to the film deposited therefrom increased resistance to chalking.

10. A paint as defined in claim 1 in which the vehicle is an oil varnish and the barium borate is present in an amount sufficient to impart to the film deposited therefrom increased resistance to disfiguration by mold growth and associated dirt collection.

11. A paint as defined in claim 10 in which the oil varnish is a film-forming, oil-modified alkyd resin.

12. A paint as defined in claim 1 in which the vehicle consists of a film-forming copolymer of a drying oil and a compound of the group consisting of cyclopentadiene, styrene, and alpha-methylstyrene and the barium borate is present in an amount sufficient to impart to the film deposited therefrom increased resistance to disfiguration by mold growth and associated dirt collection.

13. A paint as defined in claim 1 in which the vehicle consists of a drying oil and the barium borate is present in an amount sufficient to impart to the film deposited therefrom increased resistance to disfiguration by mold growth and associated dirt collection.

14. A process for the production of a paint, the films of which are less susceptible to disfiguration by mold growth and associated dirt collection and less susceptible to chalking, which comprises adding to a paint having a composition as defined in claim 1 a barium borate as defined in claim 1 in an amount between approximately 2 and approximately 20 percent by weight of the paint, and distributing the barium borate uniformly therein.

15. An article coated with a pigmented film formed from a drying oil binder and containing uniformly distributed therethrough in particulate form a barium borate as defined in claim 1.

References Cited in the file of this patent

UNITED STATES PATENTS 2,556,953    Young ------------------ June 12, 1951

U. S. DEPARTMENT OF COMMERCE
PATENT OFFICE
CERTIFICATE OF CORRECTION

December 31, 1957

Patent No. 2,818,344

Stanley J. Buckman

It is hereby certified that error appears in the printed specification of the above numbered patent requiring correction and that the said Letters Patent should read as corrected below.

Column 2, line 14, for "calking" read -- chalking --; column 4, line 47, the numeral "80" should not be in bold-face type; column 7, line 7, for "BaO.2B$_2$O$_3$" read -- BaO·2B$_2$O$_3$ --; column 10, line 63, for "(Ti-Pure R-6.10)" read -- (Ti-Pure R-610) --; column 14, line 33, after "Component" insert a colon; column 15, line 17, for "alphamethylstyrene" read -- alpha-methylstyrene --; column 17, line 20, for "eessentially" read -- essentially --.

Signed and sealed this 15th day of April 1958.

(SEAL)
Attest:
KARL H. AXLINE
Attesting Officer

ROBERT C. WATSON
Commissioner of Patents